United States Patent Office 3,043,831
Patented July 10, 1962

1

3,043,831
SYNTHETIC PENICILLINS
Frank Peter Doyle, 42 Hillside Gardens, Betchworth,
Surrey, England, and John Herbert Charles Nayler,
Coombelea, Cliftonville, Dorking, Surrey, England
No Drawing. Filed July 17, 1961, Ser. No. 124,342
Claims priority, application Great Britain July 18, 1960
6 Claims. (Cl. 260—239.1)

This invention relates to new synthetic compounds of value as intibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to novel substituted, fused ring 6-benzamidopenicillanic acids and non-toxic salts thereof.

Antibacterial agents such as benzylpenicillin have proved highly effective in the past in the therapy of infections due to Gram-positive bacteria, but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effecive against benzylpenicillin-resistant strains of bacteria or inhibit benzylpenicillinase and thus potentiate the action of benzylpenicillin when admixed therewith and are safe for use in patients who cannot be given benzylpenicillin because they exhibit allergic reactions thereto.

There is provided as one preferred embodiment of the present invention a member selected from the group consisting of an acid having the formula

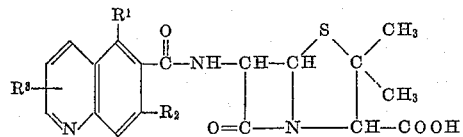

wherein $R^1$, $R^2$ and $R^3$ each represent a member selected from the group consisting of hydrogen, nitro, amino, (lower)alkyl, (lower)alkoxy, (lower)alkylamino, di-(lower)alkylamino, acylamino (where the acylating agent is an aliphatic carboxylic acid containing from one to ten carbon atoms inclusive and thus may also be named (lower)alkanoylamino), chloro, bromo, iodo, fluoro, trifluoromethyl, allyl, allyloxy, hydroxy, sulfamyl, (lower)-alkylthio, cyclohexyl, cyclopentyl, cycloheptyl, aryloxy [including phenoxy, chlorophenoxy, bromophenoxy, (lower)alkylphenoxy, e.g., tolyloxy and (lower)alkoxyphenoxy, e.g., methoxyphenoxy, etc.], aralkyl [including benzyl, α- and β-phenethyl, and α- and β- and γ-phenylpropyl, etc.], arylthio [including phenylthio, chlorophenylthio, (lower)alkylphenylthio, (lower)alkoxyphenylthio, etc.] and aryl [including phenyl, chlorophenyl, bromophenyl, (lower)alkylphenyl, (lower)alkoxyphenyl, etc.], and nontoxic salts thereof.

It is preferred that $R^1$ be (lower)alkoxy and that $R^2$ and $R^3$ be hydrogen.

As a second preferred embodiment of the present invention there is provided a member selected from the group consisting of an acid having the formula

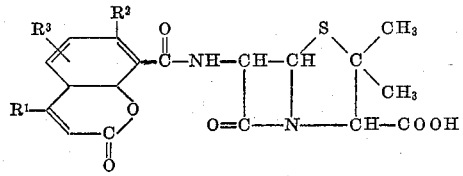

wherein $R^1$, $R^2$ and $R^3$ each represent a member selected from the group consisting of hydrogen, nitro, amino, (lower)alkyl, (lower)alkoxy, (lower)alkylamino, di-(lower)alkylamino, acylamino (where the acylating agent is an aliphatic carboxylic acid containing from one to ten carbon atoms inclusive and thus may also be named (lower)alkanoylamino), chloro, bromo, iodo, fluoro, trifluoromethyl, allyl, allyloxy, hydroxy, sulfamyl, (lower)-alkylthio, cyclohexyl, cyclopentyl, cycloheptyl, aryloxy [including phenoxy, chlorophenoxy, bromophenoxy, (lower)alkylphenoxy, e.g., tolyloxy and (lower)alkoxyphenoxy, e.g., methoxyphenoxy, etc.], aralkyl [including benzyl, α- and β-phenethyl, and α- and β- and γ-phenylpropyl, etc.], arylthio [including phenylthio, chlorophenylthio, (lower)alkylphenylthio, (lower)alkoxyphenylthio, etc.] and aryl [including phenyl, chlorophenyl, bromophenyl, (lower)alkylphenyl, (lower)alkoxyphenyl, etc.], and nontoxic salts thereof.

As a third preferred embodiment of the present invention there is provided a member selected from the group consisting of an acid having the formula

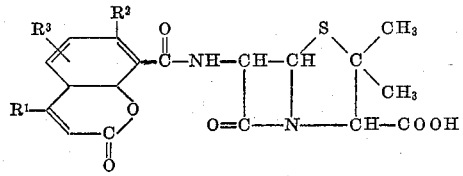

wherein $R^1$, $R^2$ and $R^3$ each represent a member selected from the group consisting of hydrogen, nitro, amino, (lower)alkyl, (lower)alkoxy, (lower)alkylamino, di-(lower)alkylamino, acylamino (where the acylating agent is an aliphatic carboxylic acid containing from one to ten carbon atoms inclusive and thus may also be named (lower)alkanoylamino), chloro, bromo, iodo, fluoro, trifluoromethyl, allyl, allyloxy, hydroxy, sulfamyl, (lower)-alkylthio, cyclohexyl, cyclopentyl, cycloheptyl, aryloxy [including phenoxy, chlorophenoxy, bromophenoxy, (lower)alkylphenoxy, e.g., tolyloxy and (lower)alkoxyphenoxy, e.g., methoxyphenoxy, etc.], aralkyl [including benzyl, α- and β-phenethyl, and α- and β- and γ-phenylpropyl, etc.], arylthio [including phenylthio, chlorophenylthio, (lower)alkylphenylthio, (lower)alkoxyphenylthio, etc.] and aryl [including phenyl, chlorophenyl, bromophenyl, (lower)alkylphenyl, (lower)alkoxyphenyl, etc.], and nontoxic salts thereof. It is preferred that $R^2$ be (lower)alkoxy, that $R^1$ be (lower)alkyl or hydrogen and that $R^3$ be hydrogen.

Such nontoxic metallic salts include the sodium, potassium, calcium and aluminum salts, the ammonium salt and substituted ammonium salts; e.g., salts of such nontoxic amines as trialkylamines, including tri(lower) alkylamines such as triethylamine, procaine, dibenzylamine, N-benzyl-beta-phenethylamine, 1 - ephenamine, N,N'-dibenzylethylenediamine, dehydroabietylamine, N,N'-bis-dehydroabietylethylenediamine, N - (lower) - alkylpiperidines, e.g., N-ethylpiperidine, and other amines which have been used to form salts with benzylpenicillin. The term "(lower)alkyl" as used herein means both straight and branched chain aliphatic hyrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with the appropriate acid chloride or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

One method of preparing compounds of the present invention is by way of a mixed anhydride of an alkyl chlorocarbonate and comprises mixing an acid (whose acid chloride is set forth above) with the alkyl chlorocarbonate and a tertiary hydrocarbonyl or aliphatic amine such as triethylamine in an anhydrous, inert and preferably water-miscible solvent such as dioxane and if desired a small amount of pure dry acetone. To this solution of the mixed anhydride there is then added a chilled solution of 6-aminopenicillanic acid and tertiary hydrocarbonyl amine, e.g. triethylamine, in, for example, a solvent such as water to form the substituted ammonium salt of the desired product. The mixture may then, if desired, be extracted at alkaline pH with a water-immiscible solvent such as ether to remove unreacted starting materials. The product in the aqueous phase is then converted to the free acid, preferably in the cold under a layer of ether by the addition of dilute mineral acid. The free acid is then extracted into a water-immiscible, neutral organic solvent such as ether and the extract is washed with water and then dried. The product in the ethereal extract in its free acid form is then converted to any desired metal or amine salt by treatment with the appropriate base, e.g., a free amine such as procaine base or a solution of potassium 2-ethyl-hexanoate in dry n-butanol. These salts are usually insoluble in solvents such as ether and can be recovered in pure form by simple filtration.

Another method of preparing an ethereal solution of the acid form of a compound of the present invention comprises preparing an aqueous solution of 6-aminopenicillanic acid and sodium bicarbonate and then adding the acid chloride. The mixture is then extracted with ether to remove unreacted or hydrolyzed starting materials. The solution is then acidified and the free acid form of the product is extracted into ether. This ethereal extract is dried, e.g., with anhydrous sodium sulphate, and the drying agent is removed to leave a dry, ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by equimolecular amount of the corresponding acid bromide or acid anhydride.

In the case in which the acid chloride reacts more rapidly with water than with the 6-aminopenicillanic acid, it is necessary to use anhydrous conditions. Thus the 6-aminopenicillanic acid and triethylamine is mixed with an anhydrous solvent, e.g. acetone, chloroform or methylene dichloride and the acid chloride in the same solvent is added thereto. The mixture is then acidified and the aqueous layer removed. The solvent layer is then treated with sodium or potassium bicarbonate solution and the aqueous bicarbonate layer separated and concentrated to isolate the sodium or potassium salt of the penicillin.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substances.

The temperature chosen for the process of the present invention should in general not exceed 30° C. and in many cases a suitable temperature is ambient temperature. Since the use of strongly acid or alkaline aqueous conditions in the process of this invention should be avoided, it has been found preferable to perform the process at a pH of from 6 to 9, and this can conveniently be achieved by using a buffer, for example a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents, e.g., dimethylformamide, dimethylacetamide, chloroform, acetone, methylene dichloride, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethyl formamide. Vigorous stirring is, of course, advisable when more than one phase is present, e.g., solid and liquid or two liquid phases.

At the conclusion of the reaction, the products are isolated if desired by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of sodium or potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, careful treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. One method of isolating the product as a crystalline potassium salt comprises extracting the product from an acidic, aqueous solution (e.g., pH 2) into diethyl ether, drying the ether and adding at least one equivalent of a concentrated solution of potassium 2-ethylhexanoate

EXAMPLE 1

2-Methoxy-5:6-Methylenedioxyphenylpenicillin (Sodium Salt)

A mixture of 2-methoxy-5:6-methylenedioxybenzoic acid (1.85 g.) and thionyl chloride (1.5 ml.) was refluxed for 1 hour with exclusion of moisture and the excess thionyl chloride was then removed under reduced pressure. A solution of the residue in anhydrous alcohol-free chloroform (10 ml.) was added dropwise to a stirred mixture of 6-aminopenicillanic acid (2.16 g.), triethylamine (1.5 ml.) and anhydrous alcohol-free chloroform (30 ml.) during 30 minutes. After stirring for a further 1 hour, the mixture was extracted with a mixture of iced water (100 ml.) and 1 N hydrochloric acid (20 ml.). The chloroform phase was separated and shaken with water (10 ml.) and 3% w./v. aqueous sodium bicarbonate (28 ml.). An emulsion formed which would not separate, so the whole mixture was evaporated at room temperature under high vacuum and the residue washed by decantation with anhydrous ether. In this way the product was obtained as a buff-colored powder (2.8 g.); purity (by hydroxylamine assay)=72%.

The 2-methoxy-5:6-methylenedioxybenzoic acid, M.P. 142° C., was prepared by the reaction of sesamol methyl ether with n-butyl lithium, followed by carbonation. The sesamol methyl ether, B.P. 110–120° C./15 mm., itself was prepared by the action of alkaline methyl sulphate on sesamol.

EXAMPLE 2

6-Quinolylpenicillin

A solution of quinoline-6-carboxylic acid (415 mg.) and triethylamine (0.34 ml.) in dry acetone (8 ml.) was stirred and cooled to 0° C. A solution of ethyl chlorocarboate (0.21 ml.) in dry acetone (4 ml.) was added dropwise over 10 minutes with continuous cooling and stirring. After a further 25 minutes the precipitated triethylamine hydrochloride was removed by filtration. The cold filtrate (which contained the mixed ethoxyformic anhydride of quinoline-6-carboxylic acid) was added slowly to a stirred solution of 6-aminopenicillanic acid (400 mg.) and sodium bicarbonate (156 mg.) in water (12 ml.) at 0° C. The solution was stirred for 2½ hours while it attained room temperature and the pH adjusted to neutrality.

The solution was washed with ether (18 ml.), and then the aqueous phase was evaporated at low pressure and temperature.

The residue was finally dried over phosphorus pentoxide in vacuo to give 6-quinolylpenicillin as an orange-brown solid (710 mg.), estimated by manometric assay to be 73% pure.

Paper chromatography revealed the presence of a new antibiotic, together with a trace of unreacted 6-aminopenicillanic acid. The product inhibited *Staph. aureus* at a concentration of 0.12 mcg./ml.

EXAMPLE 3

4-Methyl-7-Methoxy-8-Coumarinylpencillin (Sodium Salt)

4-methyl-7-methoxycoumarin-8-carboxylic acid (2.34 g., 0.01 mole) was covered with thionyl chloride (2.9 ml., 0.04 mole) and the mixture was refluxed for one hour. The excess of thionyl chloride was removed under reduced pressure and the white crystalline residue was mixed with anhydrous alcohol-free chloroform (20 ml.). This suspension was then added in three equal portions during about 5 minutes to a stirred mixture of 6-aminopencillanic acid (2.16 g., 0.01 mole), triethylamine (2.8 ml., 0.02 mole) and anhydrous alcohol-free chloroform (30 ml.). The mixture was stirred for a further 2 hours, filtered to remove some insoluble material, and extracted with water (10 ml.) plus sufficient N hydrochloric acid to give an aqueous phase of pH 2 (required 12.5 ml.). The chloroform phase was then extracted with water (10 ml.) plus sufficient 3% w.v. aqueous sodium bicarbonate to give an aqueous phase of pH 7 (required 17 ml.). After being washed with ether (2 x 20 ml.), the bicarbonate phase was evaporated at room temperature under high vacuum and the residue was dried in vacuum over phosphorus pentoxide to give the penicillin as a buff power (1.45 g.); purity (by hydroxylamine assay)=28%.

It inhibited Staph. Oxford at concentration of 2.5 mcg./ml., Staph. 1 at 6.25 mcg./ml. and Staph. 2 at 5 mcg./ml.

Other acids used to prepare new penicillins in accordance with the present invention include 6-methoxy-1,4-benzodioxane-5-carboxylic acid,
6-methoxy-3-methylbenzofuran-7-carboxylic acid,
5,6-dimethoxyphthalen-4-carboxylic acid,
6-methoxyphthalide-7-carboxylic acid,
7-methoxy-2-phenylchroman-8-carboxylic acid,
6-methoxyquinoline-5-carboxylic acid,
7-methoxyquinoline-8-carboxylic acid,
5-ethoxybenzotriazole-4-carboxylic acid,
6-chloro-1-phenylbenzotriazole-7-carboxylic acid,
5-methoxythianaphthene-4-carboxylic acid and
4-chloro-3-hydroxy-6-methylthianaphthene - 7 - carboxylic acid.

We claim:
1. A compound selected from the group consisting of an acid having the formula

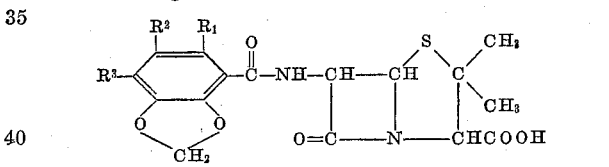

wherein $R^1$, $R^2$ and $R^3$ each represent a member selected from the group consisting of hydrogen, nitro, amino, (lower)alkyl, (lower)alkoxy, (lower)alkylamino, di-(lower)alkylamino, (lower)alkanoylamino, chloro, bromo, iodo, fluoro, trifluoromethyl, allyl, allyoxy, hydroxy, sulfamyl, (lower)alkylthio, cyclohexyl, cycopentyl, cycloheptyl, phenoxy, chlorophenoxy, bromophenoxy, (lower)-alkylphenoxy, (lower)alkoxyphenoxy, benzyl, phenethyl, phenylpropyl, phenylthio, chlorophenylthio, (lower)-alkylphenylthio, (lower)alkoxyphenylthio, phenyl, chlorophenyl, bromophenyl, (lower)alkylphenyl and (lower)-alkoxyphenyl and its sodium, potassium, calcium, aluminum and ammonium salts and its nontoxic substituted ammonium salts with an amine selected from the group consisitng of tri(lower)alkylamines, procaine, dibenzylamine, N-benzyl-beta-phenethylamine, 1 - ephenamine, N,N'-bis-dehydroabiethylethylenediamine, N,N'-dibenzylethylenediamine, dehydroabiethylamine and N-(lower)-alkylpiperidines.

2. A compound selected from the group consisting of an acid having the formula

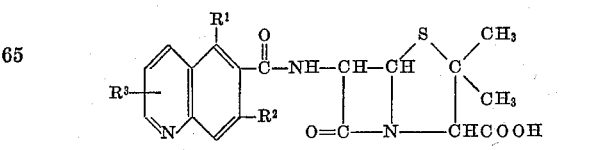

wherein $R^1$, $R^2$ and $R^3$ each represent a member selected from the group consisting of hydrogen, nitro, amino, (lower)alkyl, (lower)alkoxy, (lower)alkylamino, di-(lower)alkylamino, (lower) alkanoylamino, chloro, bromo, iodo, fluoro, trifluoromethyl, allyl, allyloxy, hydroxy, sulfamyl, (lower)alkylthio, cyclohexyl, cyclopentyl, cycloheptyl, phenoxy, chlorophenoxy, bromophenoxy, (lower)-alkylphenoxy, (lower)alkoxyphenoxy, benzyl, phenethyl, phenylpropyl, phenylthio, chlorophenylthio, (lower)alkylphenylthio, (lower)alkoxyphenylthio, phenyl, chlorophenyl, bromophenyl, (lower)alkylphenyl and (lower)-alkoxyphenyl and its sodium, potassium, calcium, aluminum and ammonium salts and its nontoxic substituted ammonium salts with an amine selected from the group consisting of tri(lower)alkylamine, procaine, dibenzylamine, N - benzyl - beta-phenethylamine, 1-ephenamine, N,N'-bis-dehydroabietylethylenediamine, N,N'-dibenzylethylenediamine, dehydroabietylamine and N-(lower)-alkylpiperidines.

3. A compound selected from the group consisting of an acid having the formula

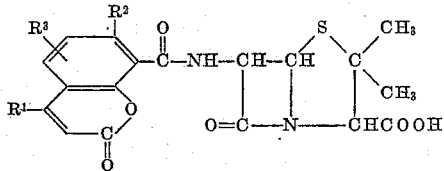

wherein $R^1$, $R^2$ and $R^3$ each represent a member selected from the group consisting of hydrogen, nitro, amino, (lower)alkyl, (lower)alkoxy, (lower)alkylamino, di-(lower)alkylamino, (lower)alkanoylamino, chloro, bromo, iodo, fluoro, trifluoromethyl, allyl, allyloxy, hydroxy, sulfamyl, (lower)alkylthio, cyclohexyl, cyclopentyl, cycloheptyl, phenoxy, chlorophenoxy, bromophenoxy, (lower)alkylphenoxy, (lower)alkoxyphenoxy, benzyl, phenethyl, phenylpropyl, phenylthio, chlorophenylthio, (lower)alkylphenylthio, (lower)alkoxyphenylthio, phenyl, chlorophenyl, bromophenyl, (lower)alkylphenyl and (lower)alkoxyphenyl and its sodium, potassium, calcium, aluminum and ammonium salts and its nontoxic substituted ammonium salts with an amine selected from the group consisting of tri(lower)alkylamines, procaine, dibenzylamine, N-benzyl-beta - phenethylamine, 1 - ephenamine, N,N'-bis-dehydroabietylethylenediamine, N,N'-dibenzylethylenediamine, dehydroabietylamine and N-(lower)alkylpiperidines.

4. 2-methoxy-5,6-methylenedioxyphenylpenicillin.
5. 6-quinolylpenicillin.
6. 4-methyl-7-methoxy-8-coumarinylpenicillin.

References Cited in the file of this patent
UNITED STATES PATENTS
2,941,995     Doyle et al. _____ June 21, 1960

UNITED STATES PATENT OFFICE
CERTIFICATE OF CORRECTION

Patent No. 3,043,831                      July 10, 1962

Frank Peter Doyle et al.

It is hereby certified that error appears in the above numbered patent requiring correction and that the said Letters Patent should read as corrected below.

Column 5, lines 39 and 40, for "chlorocarboate" read -- chlorocarbonate --; line 42, for "stirning" read -- stirring --; column 6, line 7, for "w.v." read -- w./v. --; line 14, after "at" insert -- a --; line 46, for "allyoxy" read -- allyloxy --; line 58, for "N,N'-bis-dehydroabiethylethylenediamine" read -- N,N'-bis-dehydroabietylethylenediamine --; same column 6, line 59, for "dehydroabiethylamine" read -- dehydroabietylamine --.

Signed and sealed this 30th day of October 1962.

(SEAL)
Attest:

ERNEST W. SWIDER
Attesting Officer

DAVID L. LADD
Commissioner of Patents